(12) United States Patent
Derzon (10) Patent No.: US 11,802,982 B2
(45) Date of Patent: Oct. 31, 2023

(54) DIRECTIONAL AND PROMPT RADIATION DOSE SENSOR

(71) Applicant: Mark Derzon, Albuquerque, NM (US)

(72) Inventor: Mark Derzon, Albuquerque, NM (US)

( * ) Notice: Subject to any disclaimer, the term of this patent is extended or adjusted under 35 U.S.C. 154(b) by 0 days.

(21) Appl. No.: 17/605,172

(22) PCT Filed: Mar. 23, 2020

(86) PCT No.: PCT/US2020/024147
§ 371 (c)(1),
(2) Date: Oct. 20, 2021

(87) PCT Pub. No.: WO2020/198109
PCT Pub. Date: Oct. 1, 2020

(65) Prior Publication Data
US 2022/0206171 A1  Jun. 30, 2022

Related U.S. Application Data (60) Provisional application No. 62/825,467, filed on Mar. 28, 2019.

(51) Int. Cl.
*G01T 7/00* (2006.01)
*G01T 1/105* (2006.01)
*G01T 1/20* (2006.01)
*G01T 1/24* (2006.01)

(52) U.S. Cl.
CPC ............ *G01T 7/00* (2013.01); *G01T 1/105* (2013.01); *G01T 1/20* (2013.01); *G01T 1/24* (2013.01)

(58) Field of Classification Search
CPC .. G01T 7/00; G01T 1/105; G01T 1/20; G01T 1/24; G01T 1/02
See application file for complete search history.

(56) References Cited

U.S. PATENT DOCUMENTS

| | | | |
|---|---|---|---|
| 9,046,611 B2 | 6/2015 | Takeuchi et al. | |
| 9,739,892 B2 | 8/2017 | Cameron | |
| 9,835,735 B2 | 12/2017 | Preston | |
| 9,939,319 B2 | 4/2018 | Wolf et al. | |
| 2003/0057380 A1* | 3/2003 | Katagiri ............ G01T 1/2014 | |
| | | | 250/484.5 |
| 2012/0261785 A1 | 10/2012 | Barlow | |
| 2018/0267174 A1 | 9/2018 | Liang et al. | |

* cited by examiner

*Primary Examiner* — Kiho Kim
(74) *Attorney, Agent, or Firm* — V Gerald Grafe (57) ABSTRACT

The present invention provides a system that can enable measurement of prompt and delayed radiation doses. Some embodiments provide a high dynamic range in dose and dose rate. Some embodiments can determine the direction of greatest dose and direction of lower radiation dose and dose rate. Embodiments include variations as well for individual and small group survival enhancement such as directional systems, packaging to meet harsh environmental conditions and nuclear survivability, low power, large-area dose and dose rate, rate mapping, data storage and exfiltration.

20 Claims, 5 Drawing Sheets

Additional Network sensors (see stars) will add additional information to an understanding of the radiation between sensors, a map to provide safer path to leave the area.

$$\vec{d} = (x_1 - x_2)\hat{x} + (y_1 - y_2)\hat{y} + (z_1 - z_2)\vec{z}$$

DIRECTIONAL AND PROMPT RADIATION DOSE SENSOR

FIELD OF THE INVENTION

The invention is in the field of radiation sensing, specifically in the field of measurement of radiation dose and doserate with sub specialties of directionality, environmental, forensics and civil defense.

BACKGROUND

Prompt radiation dose involves a very high radiation dose rate but for a very brief period of time. Machinery such as that used in Simulation Sciences and medical x rays, accidents, nuclear weapons and terrorist acts can create these high dose rate environments. Many of those environments have high steady state or delayed radiation doses as well. Mass production sensors capable of providing dose or dose rate data for the prompt alone dose do not yet exist. Sensors that will function electronically after a prompt situation and measure total radiation dose (from the delayed signal as well) do not exist. Current technologies fail to give accurate time histories and integrated doses. This is because either they cannot work through the prompt signature or the accumulated dose will affect the electronics of processing and readout.

Delayed dose refers to radiation that can be spread by radioactive fallout, radiation dispersal devices or other means which will result in appreciable radiation over a long period of time. If the relevant dose is received from a residual dose rate field, the technology already exists for simple dose and doserate measurements. Technology for this also already exists in the form of several solid-state dosimetry materials. See, e.g., Knoll's Radiation Detection and Measurement, Ed. 4. However, there are currently no devices that can measure these biologically relevant doses and doserates (meaning from ~10× the lethal dose to 50% of people in 30 days ($LD_{50/30}$) to background) and provide guidance regarding a direction to move relative to the source of the radiation. In addition, existing electronics and stand-alone systems can fail because they are not robust enough to handle the high radiation parameters, integrated doses, low power requirements and the effects of a large electromagnetic pulse (EMP).

There are sophisticated radiation sensors that can study radiation fields in detail and do high resolution spectroscopy. These are expensive and need expertise to interpret the results. Some of these devices can provide both spectra and directional information, however they are limited in the data rate they can process the more complicated spectra and directional information. That means they cannot work in many of the important environments mentioned above. As important, highly directional spectroscopic systems are not made with high radiation doserates. See reference list below.

Legacy detectors such as Geiger-Mueller tubes, single point sensors (such as scintillators or PMTs) are typically not designed to work at high rates or in high total dose and dose rate scenarios. Even if a GM, or other detector, detector might work to measure a dose rate or total dose accurately, the detector will fail if the dose is delivered too quickly (high dose rate). For instance, G. Knoll's text describes paralyzable detectors. The paralyzable detectors simply fail to count above a certain rate giving the user the wrong idea about the radiation field. Other detectors may simply saturate, letting the user know there is a high field but not providing an accurate idea of the threat experienced. And some detectors are relatively dose and dose rate insensitive however they require separate readers. An example of this is the Thermoluminescent detector (TLD) and the optically Stimulated Luminescent detector (OSL). Some detectors such as the RADFet will read accurately if they are powered down during the prompt pulse. If hit with an intense burst under power these devices and most silicon-based devices will readout inaccurately or fail outright. They will fail under the high dose and/or doserate conditions. The doserate can be too high, the radiation can destroy the electronics and the EMP and SGEMP (System Generated EMP) will interfere with function in currently available commercial devices. There is a need for technology that can extend beyond those technologies into this arena of providing more information to those who need it than single point, low dynamic range systems, in order to save lives.

A survey of dominant radiation sensor companies shows that current technologies are not capable of handling high dose rates without saturating or having the electronics fail due to either EMP or radiation damage. Electronic circuits are known to fail due to electromagnetic pulses. Single event upsets also affect all electronics. The effect of these single events is pronounced.

https://spacemath.gsfc.rasa.gov/weekly/3Page6.pdf. These and other radiation induced artifacts are the reason that airplane computers are rebooted often during flight. Radiation hardened electronics have been developed but even these fail under conditions of intense prompt radiation. They can survive much better if turned off prior to the irradiation. An introduction to radiation hardened electronics can be found online at https://www.militaryaerospace.com/articles/print/volume-28/issue-6/technology-focus/radiation-hardened-space-eiectronics-enter-the-multi-core-er-a.html. For many years Aquila Technologies (https://www.aquilagroup.com) and others have used silicon-controlled rectifiers to shut off power during intense irradiation. They do not use radiation to turn on the circuitry.

Many current active radiation detectors do not measure radiation dose directly, usually a good deal of manipulation is needed to estimate radiation dose from whatever the incident radiation spectrum is and whether or not the dose experienced is neutron or gamma radiation or mixed. Scintillators and semiconductor system need to know the radiation spectrum, and even then they do not do a very good job of determining dose or dose rate. Proportional counters, GM tubes and ionization chambers can be energy compensated to provide an accurate reading of the dose, or dose rate, as long as we are not in the prompt regime.

Current commercial devices do not measure the prompt component of a nuclear explosion or burst. Most would fail permanently due to damage incurred to the processing electronics while the device electronics is turned on. Many would appear to function and give erroneous results.

Scintillators, semiconductors, proportional tubes and Geiger tubes typically require an understanding of the radiation spectrum in order to determine the true dose. There is a need for a device that can accurately determine the radiation directly in energy per gram or dose and energy per gram per second for most prompt, intense, radiation signatures.

Landauer and others have proposed building low doserate devices with directional capability (U.S. Pat. Nos. 9,429,661, 9,063,235, 9,429,661, 9,417,331, 9,115,989, 9,103,920, 9,063,235, 9,063,165, 8,785,470). These are for occupational and environmental dosimetry. They include devices to tell where the user is—not so much where the radiation is coming from. Directional information is mentioned however the technology is not clearly described. Zhong He, et al., has published extensively on use of arrays of CZT and other materials to perform imaging of sources (more complicated than this directionality scheme) as has Kai Vetter, and his group at UC-Berkeley, (using complex Germanium detectors and other devices.). These technologies will not work over a high dynamic range, they cannot work at high data rates and they must be powered during use.

SUMMARY OF THE INVENTION

The present invention provides a system that can enable measurement of prompt and delayed radiation doses. Some embodiments provide a high dynamic range in dose and dose rate. Some embodiments can determine the direction of greatest dose and direction of lower radiation dose and dose rate. Embodiments include variations as well for individual and small group survival enhancement such as directional systems, packaging to meet harsh environmental conditions and nuclear survivability, low power, large-area dose and dose rate, rate mapping, data storage and exfiltration. Some embodiments include sensors for temperature and relative humidity correction and epoch time measurement. Some embodiments involve multiple choices of sensor measurement—explicitly including devices such as the RADfet (by Varadis, Sandia National Laboratories, etc.), and thermopile array. In various embodiments either or both the thermopile sensor or SCR devices can be used to shut down and/or turn on the unit when radiation dose rates fall to acceptable levels.

BRIEF DESCRIPTION OF DRAWINGS

The accompanying drawings show aspects of the specification and practice of potential embodiments of the invention. They are meant to illustrate embodiments and serve as examples. They are not meant to limit the invention.

DETAILED DESCRIPTION OF THE INVENTION

Figure 1A:
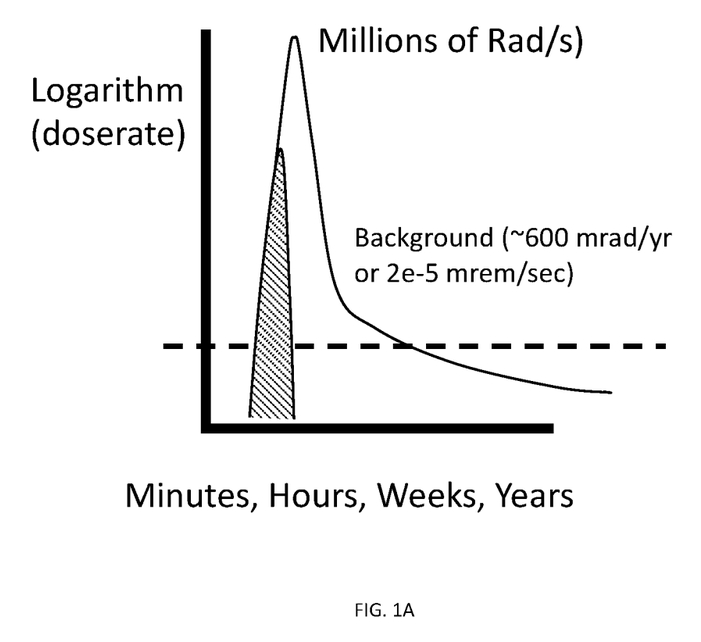
FIG. 1A is an illustration of an example time history during a terrorist act, accident or nuclear weapon event. The dashed horizontal line represents a rate above which most sensors fail to operate properly. The cross hatched area can represent a lethal dose. If the detector cannot work through the relevant radiation field it provides wrong information.
Figure 1B:
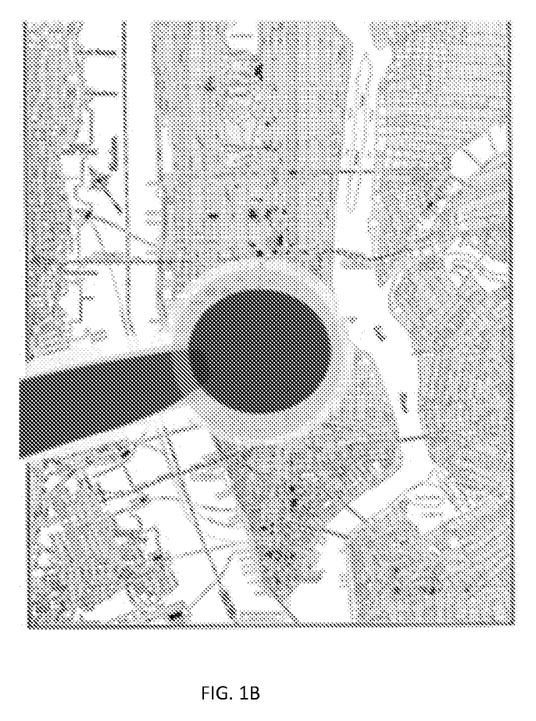
FIG. 1B is a schematic illustration of a simple model of a nuclear explosion's radiation field.

FIG. 1A is an illustration of an example time history during a terrorist act, accident or nuclear weapon event. Typically, there will be an intense burst of radiation followed by lower intensity longer-lived tail, and the radiation can last a long time. There will also be a spatial footprint. FIG. 1B is a schematic illustration of a simple model of a nuclear explosion's radiation field. Notice the gradients in the radiation field (depicted in the figure as shading from black to gray): if one can measure where one is in the gradient one can make informed decisions about where or if to move. These types of maps can be estimated from public sources such as https://nuclearsecrecy.com/nukemap/ or https://nuclearsecrecy.com/nukemap3d/ or the bomb effects computer at https://www.fourmilab.ch/bombcalc/. The intent of the figure is to illustrate that if one knows where one is and where the radiation is coming from one can move away from it. Some embodiments of the present invention can provide that information.

Figure 2:
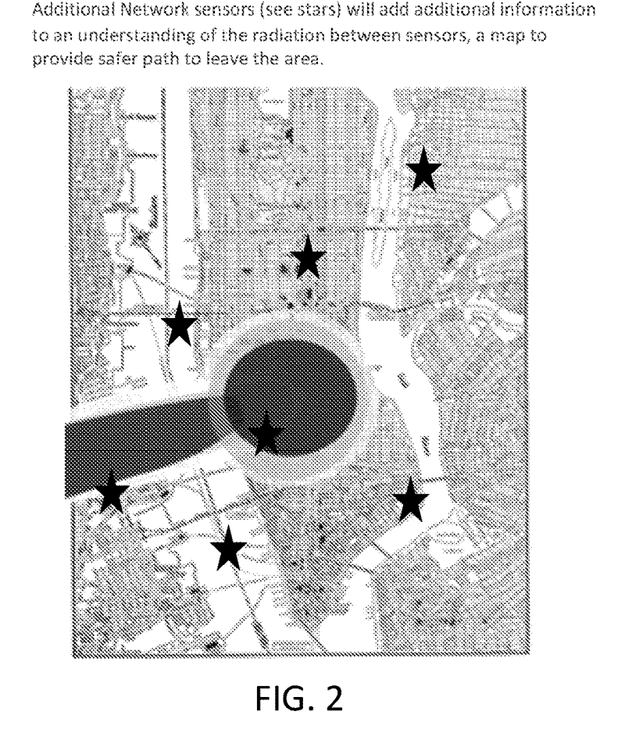
FIG. 2 is a schematic illustration of coordinated operation of multiple sensors.

FIG. 2 is a schematic illustration of coordinated operation of multiple sensors. If a number of sensors according to the present invention are configured to network together, e.g., with Bluetooth or other short-range wireless communication, after an event then they can interpret measurements at many points, enhancing the value of the information and expanding it to the community as a whole. This is represented in the figure where a few isolated points can network to provide a better idea of the radiation field with time. This can use commercial mesh or military systems interconnection technology for the sensors and users to communicate.

Following is a description of how to build an example embodiment including processing the information. Embodiments of the present invention involve various distinct components. In no particular order—some unique design features are described next. First we discuss the sensor(s) to acquire and hold the charge as well as trigger the unit, then the directional sensor and interpretation and last the electrical circuit which can allow the whole system to survive and to provide data at which point commercial electronics, and even most radiation hardened electronics, fail or provide erroneous data due to radiation induced memory upsets or failure.

The high data rate, or prompt signal, can be acquired with a sensor made from any of (1) a specially designed thermopile as described in U.S. provisional 62/770,383 filed Nov. 21, 2018, incorporated herein by reference, for bursts of penetrating radiation with a capability to trigger the turn on of all the electronics in the circuit, meaning there is no power required, with a burst of order (1 krad/s) or greater, or (2) a silicon rectifier circuit (SCR) capable of triggering the circuit (e.g., as in U.S. provisional 62/734,238 filed Sep. 20, 2018, incorporated herein by reference) by reducing its voltage in the presence of radiation and turning off the electronics so that they do not get damaged at dose rates of nominally 10 mrads/s or greater, or (3) a Compton diode which is another self-powered device capable of generating volts of output at Grad/second dose rates and greater. These can be used individually or together to minimize power requirements and maximize dynamic range. To integrate the dose as measured from any of the three at times where the signal cannot be directly stored to memory (because the memory will fail) a passive capacitive and resistive circuit, which is fairly radiation insensitive, can be used to effectively sample and hold the charge produced from the trigger circuit so that the dose during the prompt burst is captured.

Figure 3:
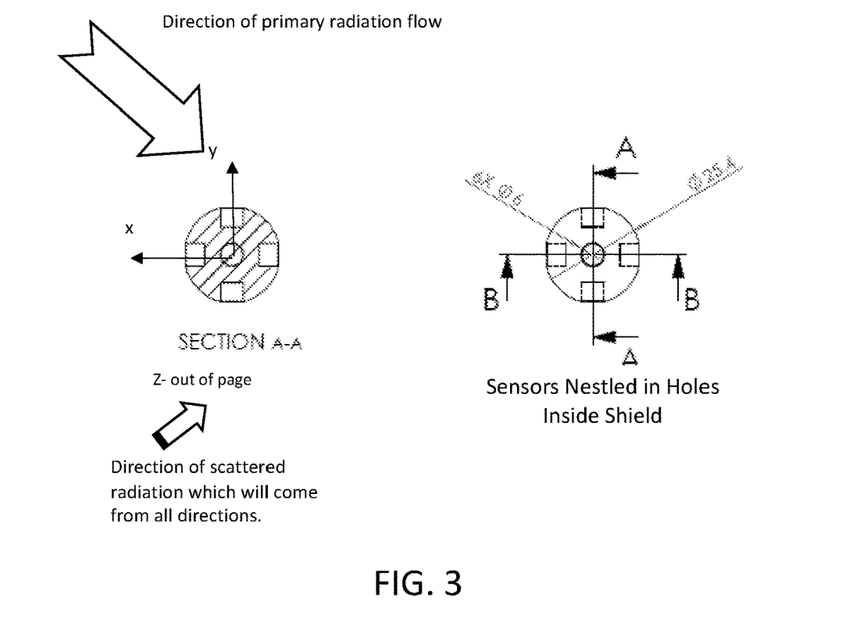
FIG. 3 is a schematic illustration of an example embodiment.

To get directional information, a dense material (where dense is defined as enough material to reduce the radiation flow across the shield by an easily measured amount (e.g. 10%)) can be used to partially reduce the radiation flux between two sensors, e.g., a RADFET (see Tyndallworks, https://www.tyndallworks.com/p-channel-radfet, last accessed Mar. 13, 2019). For most purposes we can hypothesize a fission spectrum peaking at roughly 1 MeV gamma energy; a roughly 1 cm solid length of tungsten or 2.5 cm steel can be adequate as the central shield (as shown in FIG. 3) material. More attenuating shields can be used as well, as the system tradeoffs necessitate. These dimensions are suitable dimensions for a fission radiation source. Other dimensions can be suitable for other sources and applications. The present dimensions will also be acceptable for almost all sources. For other radiation sources the preferred dimensions can be different. The number of sensors can also be modified to provide desired performance characteristics.

Figure 4:
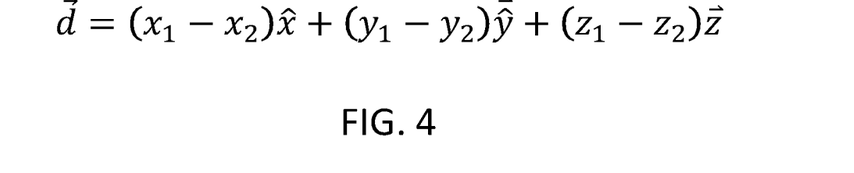
FIG. 4 is an illustration of an algorithm to obtain direction of greatest radiation concern.

A first example design, as shown in FIG. 3, comprises a sphere with holes to hold individual sensors at six points. These six points can define directional vectors whereby the signal collected generates the direction of highest dose/doserate according to the method shown in FIG. 4 and embedding the sensor in the shield reduces the role of scattered radiation. FIG. 4 is an illustration of a method to obtain direction of greatest radiation concern. Going in the opposite direction means one will move to a lower dose rate environment. In the figure, the left hand side of the equation represents the vector of the peak radiation flow. The amplitude gives the total radiation.

To get spectral energy information the attenuation of signal between sensors, due to the shielding effect of the sphere, can be used to estimate features of the radiation environment. For example, low energy x rays will not penetrate from one side of the sphere to the other. High energy radiation will penetrate more deeply. References are available into methods of providing unfolds to estimate the energy spectra (see collected works of D. L. Fehl or "Measurement of the photon field, E>150 eV on Sandia's Z Facility", Rochau, G. E., Derzon, M.; Fehl, D., et al. Rev. Sci. Instr. January 1999).

Depending on the units displayed it can represent either total dose or dose rate. The component amplitudes represent the relative amount of radiation flow on each axis.

The RADFETs are integrating devices and can serve as suitable sensors. The trapped charge acquired between successive reads can provide the dose. They have a wide dynamic range and they are commercially produced. By subtracting the signal between two of the sensors, the strength of the differential dose can be determined. Using six sensors to define the three axes and relating the directions to the device's absolute location the vector defining the radiation direction can be determined as well as the total dose and doserate. FIG. 4 generalizes the math. If location is not available then direction can be determined from a compass oriented to the device. Sandia National laboratories and other groups, in additional to Tyndall Works, over the last few decades have also developed devices with delayed signal readout.

Thermopiles, scintillators and semiconductor detectors can also be used to provide a directional signal. For this example embodiment, and in some applications, it can be important that a signal be captured and be compatible for readout after an intense pulse of radiation. An inexpensive approach is to provide sensors that are powered off during the burst, or at very low power and then get turned on. For purely time-integrated performance thermoluminescence or optically-stimulated luminescence can be used as well but the readout equipment can be bulkier and more expensive.

Figure 5A:
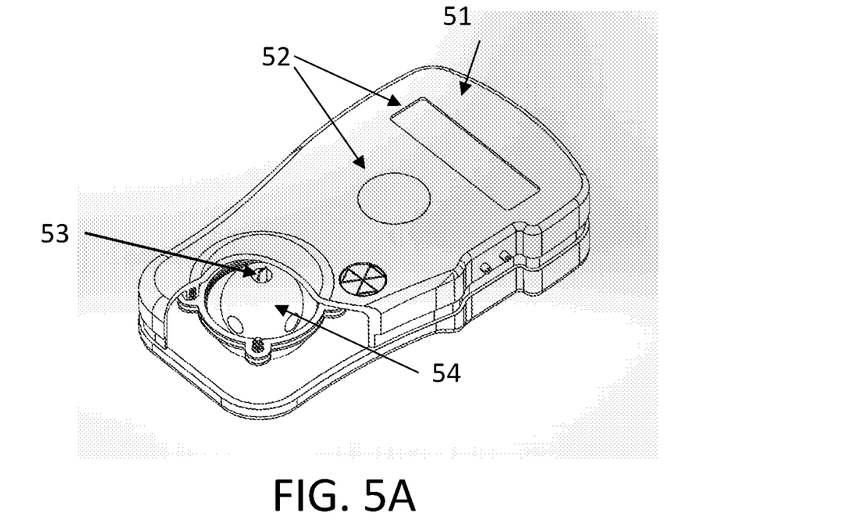
FIG. 5A is a schematic illustration of an example embodiment.
Figure 5B:
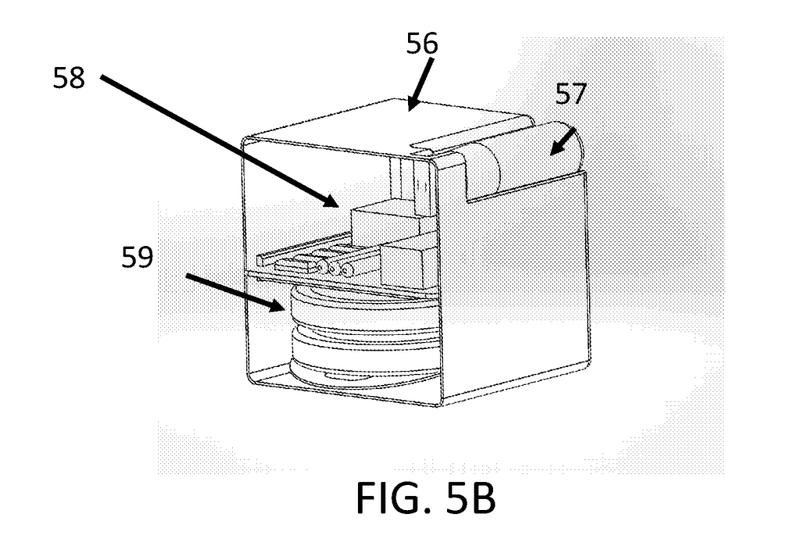
FIG. 5B is a schematic illustration of an example embodiment.
Figure 6:
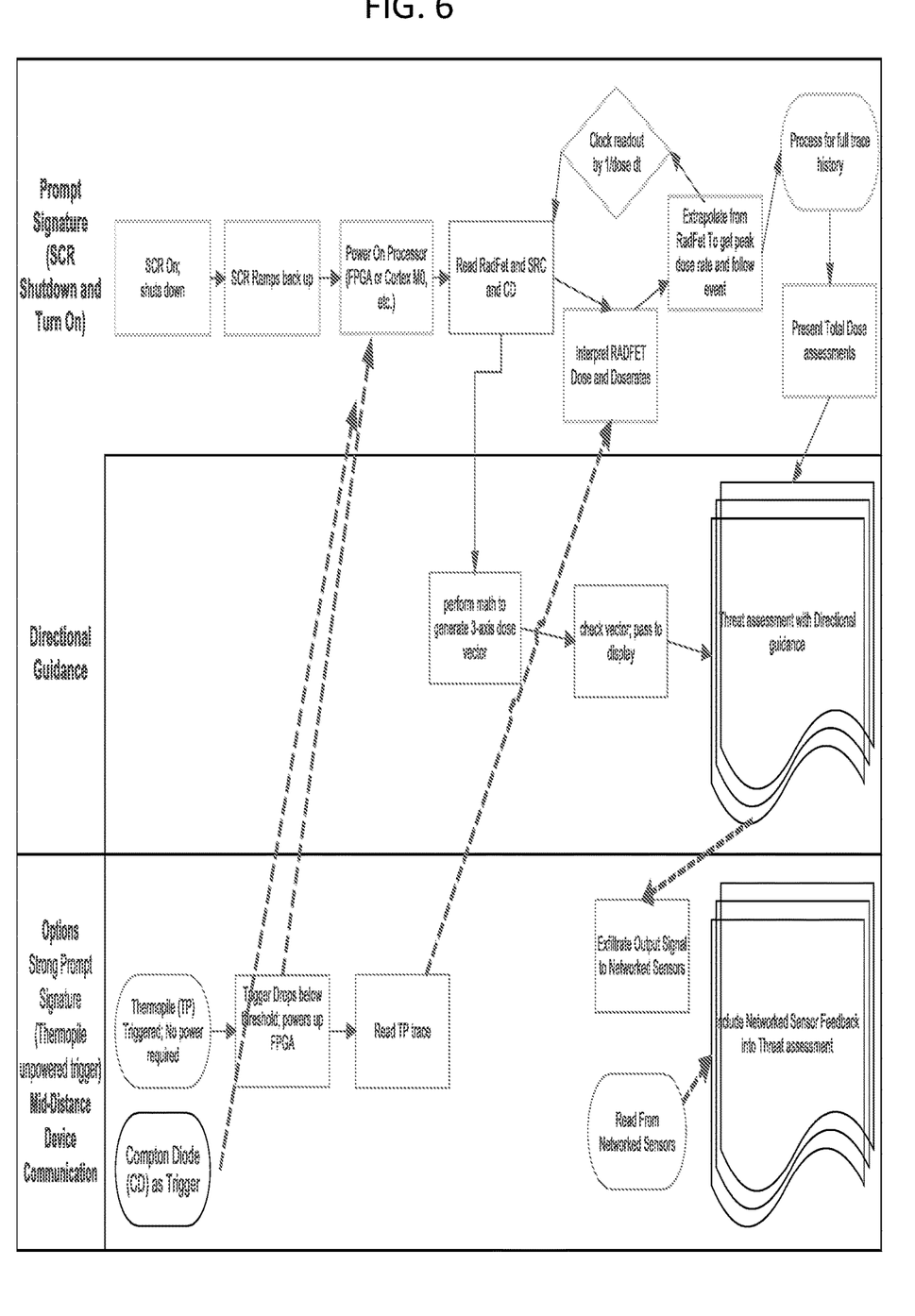
FIG. 6 is a flow chart of an example embodiment.

FIG. 5A is a schematic illustration of an example embodiment having a Faraday cage 51, display 52, sensors 53 and a high-density shield 54 used to create radiation spatial gradient with 6 sensor sets within the shield and a separate sensor set to capture the prompt signal. The display 52 can comprise, e.g., a LED display covered with a thin optically-transparent conductor, such as indium-tin oxide, to provide a device that is insensitive to a high electric field pulse. The figure does not show the power supply, battery, wires, GPS or communication components, compass, and other standard electronic components well known to those skilled in the art. Faraday cage 51 can house 2 batteries such that power is never off or EMP susceptible during charging. The sensors 53 can comprise a thermopile array and SCR circuit on a radiation hardened electronics board with wireless mesh communication and power handling, including radiation hardened electronics for processing. The system can comprise 1 or more radfet per hole, or other sensor in each shielding hole. A simplified device, showing the components extending the concept from a single sensor to a multiple element peer-to-peer array in order to map the prompt and delayed radiation field is shown in FIG. 5B. This schematically illustrates a Faraday cage 56 that can provide, e.g., 1 cubic inch of volume, power supply and an antenna 57. Sensor 58 can comprise, e.g., an optical transducer or other signal feedthrough (so that EMP does not carry between the transmitter/receiver elements to damage the devices), or other (radiation, EMP, etc). The system further comprises electronics 59 such as processor, memory, and batteries for signal exfiltration. The flow chart of FIG. 6 illustrates some important features of the invention. The flowchart has two of the three prompt sensors, the low power SCR circuit which can shut down the power to the processing electronics as well as the completely passive thermopile, using both can enhance the dynamic range. The Compton diode is not shown to reduce complexity. Only one of the three prompt sensor elements may be needed. It depends on the specific application. These provide the important features of low power and ensuring correct operation of the processing electronics. As the radiation drops below the threshold where the either the SCR (silicon Controlled Rectifier) turns on or the thermopile array meets the threshold voltage then the power can flow to the main processors. A flowchart describing the signal process flow is shown in FIG. 6.

Figure 7:
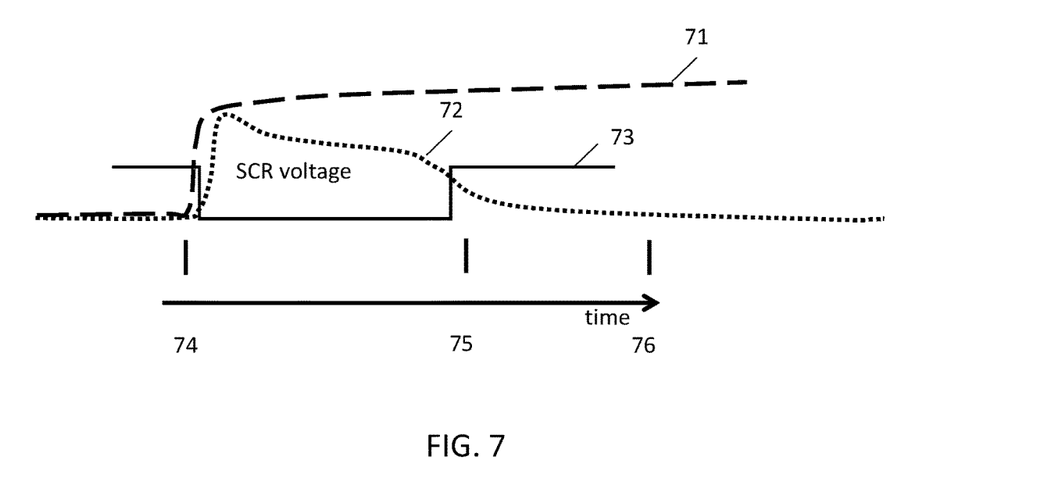
FIG. 7 is a schematic illustration of a timeline representing effect in circuit operation; unpowered during prior to TP (thermopile) signal trigger.
Figure 8:
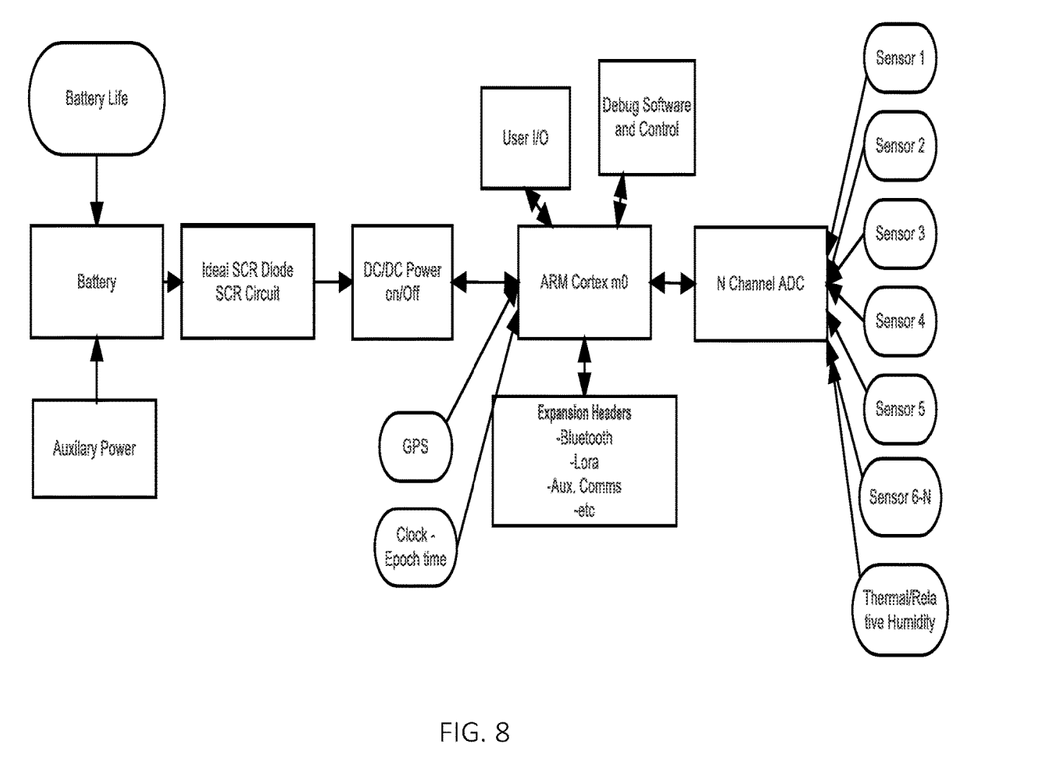
FIG. 8 is a schematic illustration of an example embodiment.

FIG. 7 shows an idealized view of a how an intense radiation pulse with a long-time component (delayed) might appear in a time sequence of device operation. FIG. 7 is a schematic illustration of a timeline representing effect in circuit operation; unpowered or at low power during the time prior to TP (thermopile) or SCR signal trigger. The figure shows a representative signal 71 from an integrating dosimeter such as OSL or RADFET signal, and a representation of thermopile voltage 72, as a function of time varying with dose rate. The trace, 73, illustrates the voltage out of the SCR circuit. Either the SCR or the Thermopile technique can control the power on to the overall circuit in order to protect the electronics under high irradiation. The SCR works by shutting the system off and the thermopile works by turning it on. A design tradeoff is that the thermopile can use less energy and can be self powered, which can be advantages in some applications. However SCR implementations are currently more easily available than thermopile implementations. Time is shown on a log scale, showing the signals in a few nanoseconds 74, few microseconds 75, to seconds 76. At the beginning the Highest Gain TP trigger signal increases; begins power to SCR Circuit, Radiation concurrently Drains the Gate Forcing SCR voltage to remain OFF. After a few microseconds, the radiation level drop to where the SCR powers back; turning on power to the electronics. After a few milliseconds, the electronics can be fully powered up and record the time markers. In some embodiments the device can be operated upon manual trigger or configured to produce periodic readings.

The present invention provides methods and apparatuses that can overcome limitations in the tools currently available to private citizens, first responders, nuclear forensic needs and/or military personnel under extreme circumstances (including accidental and deliberate nuclear tragedies).

Embodiments of the present invention provide a small, low- or no-power device capable of surviving in any situation where a human user will survive, and that provide information which can save lives by helping guide us in acting to improve the odds of survival by immediately signaling when a prompt event has occurred, to accurately reflect the dose obtained during that prompt event, and (when there is residual radiation) to provide information helping in determining whether to stay still or to attempt to leave the radiation area and in which direction to move. Currently there is no device that meets all of those requirements. There are devices that work near background (e.g., Geiger Mueller tubes, semiconductors and scintillators) and there are devices that work at high doses (see papers from the Sandia program).

The present invention provides methods for making, assembling and operation of a handheld unit that covers many orders of magnitude in dose and doserate to provide useful immediate information. The device can handle slightly above background (~0.6 rad/yr or 2e-8 rad/s) to above 1e9 rads/seconds for total doses of order 3000 rads. In addition, because it is likely that there will be no cell service and emergency services will be overwhelmed, individuals need immediate local information. Embodiments of the present invention overcome the weaknesses in prior technologies, in a single robust, handheld device. Embodiments of the present invention can measure total radiation dose during and after a prompt radiation event and provide useful directional information to enhance survival in the event of a nuclear accident, terrorist act, unusual laboratory environments or war. Embodiments can also minimize effects from SGEMP (System Generated EMP), a condition experienced under intense irradiation.

The directional algorithm can be a simple estimate of gradient along each major axis and subtraction of signal from across each access. The resultant forms the direction vector which is then oriented in space and compared to GPS location. If location is not available then direction can be determined from a compass. The figure does not show the power supply, battery, wires, GPS or communication components, compass, and other standard electronic components well known to those skilled in the art. The power used during an event will peak at approximately 1 W, during normal operation with a Cortex M0 for processing and a A/D unit 24 bits or more deep the power Extraordinarily deep dynamic range in radiation dose is generated using a thermopile array similar to those described in U.S. provisional application 62/770,383, filed Nov. 21, 2018, incorporated herein by reference, with a spread of total junction included—for instance use of 10,000, 1000, 100, 10 junctions (all of which can be made on a single sense element, fabrication chip, or both, with simple low gain electronics. In some embodiments, the electronics has an amplifier (either linear or logarithmic) capable of 5-orders in response, and consequently the thermopile array junction in these configurations will have dynamic range response of 9-orders of magnitude. The entire sensor can be a few square mm in area with a few square mm more allocated to the electronics. The additional dynamic range is acquired through the use of the secondary sensors (e.g., Rad Fets) and noise reduction such as smoothing.

The devices also can use the short distance communication built into phones (such as WiFi and Bluetooth as well as cell service; including selecting whichever communications channel is working in the event of failure of one or more) in local networks to map the radiation environment.

Example embodiments of the present invention can comprise an assembly of several components. These include:

A high dynamic range single point sensor with very low power requirements used to trigger the bulk of the system to power up. It also stores the integrated dose until the normally-off recording system is turned on. The TC technology can passively store collected charge in a circuit element. If the embodiment includes OSL components, a RADFET or a modified SCR circuit in combination then the total dose will also be stored in an integrating component.

A passive sample hold circuit to determine the timing and total dose found on the total dose circuit used to trigger the system.

A radiation-hard computational unit which can survive high dose and dose rates (such as that by or a powered down processor such as the Cortex M0.

Other tools such as Vorago chips or even 3- or 4- of the less expensive Cortex Mo using a consensus survey to avoid errors during the longer delayed, moderate dose situations can be used.

Control circuitry configured to minimize the effects of system generated EMP.

An EMP shell to reduce the effect of local-external EMP and to promote survivability of the recording and display electronics.

A circuit to allow charging of the internal battery and separate the circuit from any local grounding or voltage effects.

A secondary charging system to maintain function while charging main is recharged.

Six high dynamic range sensors (e.g., RADFETs by TyndallWorks or circuits such as those disclosed in U.S. provisional application 62/734,238 or 6 or more simple scintillator/small PMTs, a hodoscope with 6 or more channel PMTs, OSL elements and reader, RADFETs, or a simple charge collection circuit off of a drifted multiwire configuration). These are a few examples of a simple attenuation based directional count system. These will work at the lower dose rate, some will integrate over the dose range of interest. The particular sensor chosen can be determined by cost, dynamic range and other performance issues.

A radiation-hard circuit (such as that by Vorago (https://www.voragotech.com/, last accessed Mar. 14, 2009) or other computational circuit (such as the ARM Cortex M0) for capturing the traces, storing the results, and processing the information. The result will be determining the direction of maximal dose (algorithm was described above).

In passive waiting mode the unit can be charged or separated from the outside world as an electrical circuit. The thermopile can optionally be used as a self-powered trigger allowing an ultra low power mode or the existing SCR style circuit can be used to interrupt power while the dose rate is too high for the bulk of the processing electronics.

A Faraday cage enclosure with Indium Tin Oxide (ITO) or other conducting and transparent window for reading output. Major components are located within the enclosure.

A charging circuit that separates the unit electrically from ground or EMP events while charging.

Primary passive-sensor for system turn on. Use of radiation powered-pulse thermopile or other pyromotive voltage or current trigger circuit. See U.S. provisional application 62/770,383, filed Nov. 21, 2018, incorporated herein by reference.

Temperature and humidity sensors can be included with the systems described in order to correct for drift to changing electronics gain with time, temperature and humidity. Typically, drift amplitudes in even complex systems are 50-80 ppm. By employing the reference fiducial as we have we are obtaining 5-20 ppm drift and uncertainty estimates; under modified conditions we have reduced this to 1-10 ppm.

The present invention has been described in connection with various example embodiments. It will be understood that the above descriptions are merely illustrative of the applications of the principles of the present invention, the scope of which is to be determined by the claims viewed in light of the specification. Other variants and modifications of the invention will be apparent to those skilled in the art.

REFERENCES

The following references, each of which is incorporated herein by reference, can facilitate understanding of the invention.

OSL. *Radiation Measurements*, Volume 41, Issue 4, April 2006, Pages 369-391. See https://www.aquilagroup.com/ for products and usage. Aquila (https://www.aquilagroup.com last accessed Jan. 6, 2019) also uses a SCR circuit for shut down of critical electronics in high dose situations.

RadFet see: http://www.tyndallworks.com/p-channel-radfet last accessed Jan. 6, 2019. http://iopscience.iop.org/article/10.1088/0957-0233/26/2/025004/meta. Using RADFET for the real-time measurement of gamma radiation dose rat. Marko S Andjelković[1], Goran S Ristić[1] and Aleksandar B Jakšić[2], Published 20 Jan. 2015 •copyright 2015 IOP Publishing Ltd, *Measurement Science and Technology*, Volume 26 Number 2

Program at Sandia National Laboratories, https://www.sandia.gov/Pulsed-Power/research_facilities/Saturn_and_HERMES.html, last accessed Jan. 24, 2019.

C. D. Ferguson, and W. C. Potter, The Four Faces of Nuclear Terrorism, Taylor and Frances, 2005. ISBN 0415952423.

https://www.epa.gov/radiation/radiation-health-effects, last accessed Jan. 24, 2019.

https://www.fbo.gov/index?s=opportunity&mode=form&id=533d0cf90ca32f79a26b18ad806e8fd2&tab=core&_cview=0. Last accessed Jan. 24, 2019.

Z. He, W. Li, G. F. Knoll, D. K. Wehe, J. Berry, C. M. Stahle "3-D Position Sensitive CdZnTe Gamma-Ray Spectrometers." Nuclear Instruments and Methods in Physics Research A422 (1999) 173-178.

Feng Zhang, Zhong He, Dan Xu, Glenn F. Knoll, David K. Wehe, James E. Berry "Improved Resolution for 3D Position Sensitive CdZnTe Spectrometers." IEEE Transactions on Nuclear Science, Vol. 51 (5) (2004) 2427-2431.

S. D. Kiff, Z. He, G. Tepper "Improving Spectroscopic Performance of a Coplanar-Anode High-Pressure Xenon Gamma-Ray Spectrometer," IEEE Transactions on Nuclear Science, Vol. 54, No. 4 (2007) 1263-1270.

Yuefeng Zhu, Steve E. Anderson, Zhong He "Sub-Pixel Position Sensing for Pixelated, 3-D Position Sensitive, Wide Band-Gap, Semiconductor, Gamma-Ray Detectors," IEEE Transactions on Nuclear Science, vol. 58, no. 3, pp. 1400-1409, June 2011.

A. Haefner, R. Barnowski, M. Amman, J. Lee, P. Luke, L. Mihailescu, K. Vetter, "Handheld Real-time Volumetric 3-D Gamma-ray imaging", Nucl. Instr. Meth. Nucl. Instr. Meth. A 857 (2017)

M. Bandstra, T. Aucott, E. Brubaker, D. Chivers, R. Cooper, J. Curtis, J. Davis, T. Joshi, J. Kua, R. Meyer, V. Negut, M. Quinlan, B. Quiter, S. Srinivasan, A. Zakhor, R. Zhang, K. Vetter, "RadMAP: The Radiological Multi-sensor Analysis Platform", Nucl. Instr. Meth. A 840 (2016)

A. Haefner, D. Gunter, R. Barnowski, K. Vetter, "A Filtered Back-projection Algorithm for 4n Compton Camera Data", IEEE Transactions in Nuclear Science 62 (2015) 1911.

T. Aucott, M. Bandstra, V. Negut, J. Curtis, D. Chivers, K. Vetter, "Effects of Detector Efficiency and Energy Resolution on Gamma-Ray Background Rejection in Mobile Spectroscopy and Imaging Systems", Nucl. Instr. Meth. A, 789 (2015) 128.

G. Knoll, 'Radiation Detection and Measurement', 4th ed.

https://www.maximintegrated.com/en/design/technical-documents/tutoriais/7/748.html last accessed December 2019.

http://www.ti.com/lit/ds/symlink/ads125h02.pdf

I claim:

1. A sensor system comprising:
a prompt triggering and sensing element having a wide dynamic range, comprising a thermopile array having a spread of total junctions read in parallel;
a parallel circuit that enhances the dynamic range at lower dose rates;
a very high dose rate prompt sensor potential having a Compton diode as the trigger;
a low-power electronic subsystem configured to capture total dose and doserate responsive to the triggering system;
a control subsystem configured to power the system after receipt of a prompt pulse of radiation;
an EMP survival circuit and high radiation dose operation and processing circuit;
a data system for displaying, storing and exfiltrating the data;
further comprising a detector circuit having a conversion layer of a material that converts neutron radiation to a type of radiation detected by the thermopile array.

2. The system of claim 1, further comprising a determination subsystem configured to determine direction of incident radiation.

3. The system of claim 1, wherein the thermopile array comprises a junction spread of 1e6, 1e5, 10,000, 1000, 100, and 10 junctions.

4. The system of claim 3, wherein the junctions are implemented on a single sense element or a single fabrication chip.

5. The system of claim 1, further comprising an amplifier or amplifiers with 5-order response.

6. The system of claim 1 capable of operating through both a prompt, high dose rate situation as well as the longer-term delayed radiation field or fallout.

7. The system claim 1 capable of tuning at slowly rising dose rates as well as prompt to provide dose under multiple conditions.

8. The sensor system of claim 1, wherein the sensor element further comprises a RadFET.

9. The sensor system of claim 1, wherein the sensor element further comprises a scintillator, a dual-mode sensor, a light and charge sensor, an optically-stimulated luminescence sensor, or a time-resolved semi-conductor sensor.

10. The sensor system of claim 1, further comprising a temperature sensor, a humidity sensor, or both.

11. The sensor system of claim 1, wherein the data system is configured to correct the effects of signal fade with time using the clock timing.

12. The sensor system claim 1, further comprising a fiducial that facilitates correction for electronic drift near a source of noise.

13. A sensor system comprising:
- a prompt triggering and sensing element having a wide dynamic range, comprising a thermopile array having a spread of total junctions read in parallel;
- a parallel circuit that enhances the dynamic range at lower dose rates;
- a very high dose rate prompt sensor potential having a Compton diode as the trigger;
- a low-power electronic subsystem configured to capture total dose and doserate responsive to the triggering system;
- a control subsystem configured to power the system after receipt of a prompt pulse of radiation;
- an EMP survival circuit and high radiation dose operation and processing circuit;
- a data system for displaying, storing and exfiltrating the data;
- further comprising a detection circuit having a conversion layer of a material that converts gamma radiation to a type of radiation detected by the thermopile array.

14. The system of claim 13, further comprising a determination subsystem configured to determine direction of incident radiation.

15. The system of claim 13, wherein the thermopile array comprises a junction spread of 1e6, 1e5, 10,000, 1000, 100, and 10 junctions.

16. The system of claim 15, wherein the junctions are implemented on a single sense element or a single fabrication chip.

17. The system of claim 13, further comprising an amplifier or amplifiers with 5-order response.

18. The sensor system of claim 13, wherein the sensor element further comprises a RadFET.

19. The sensor system of claim 13, wherein the sensor element further comprises a scintillator, a dual-mode sensor, a light and charge sensor, an optically-stimulated luminescence sensor, or a time-resolved semi-conductor sensor.

20. The sensor system of claim 13, further comprising a temperature sensor, a humidity sensor, or both.

* * * * *